Nov. 11, 1924.
1,515,017
W. H. ENFIELD ET AL
WARNING SIGNAL
Filed Feb. 28, 1924   5 Sheets-Sheet 1
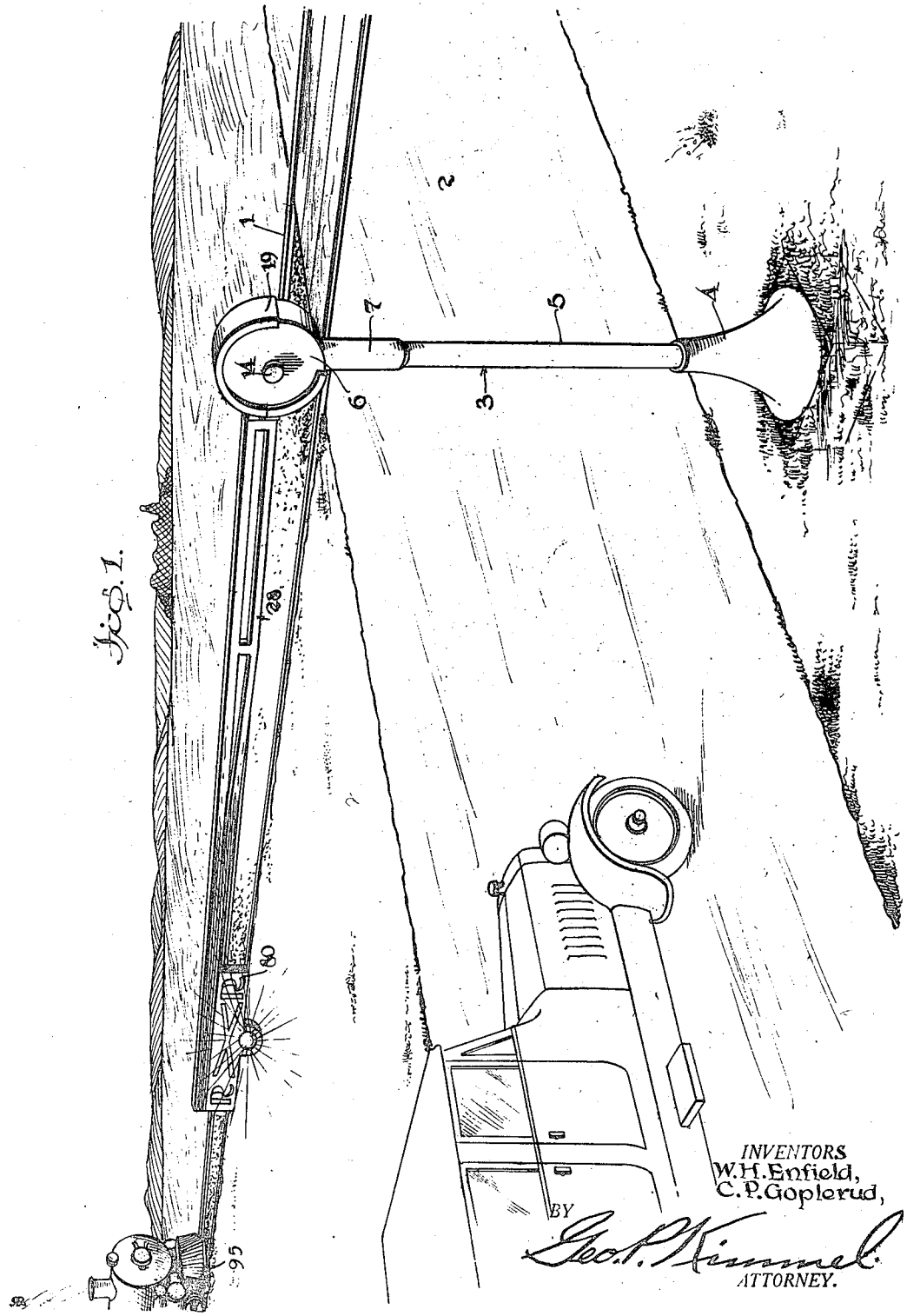
INVENTORS
W.H. Enfield,
C.P. Goplerud,
BY
Geo. P. Kimmel
ATTORNEY.

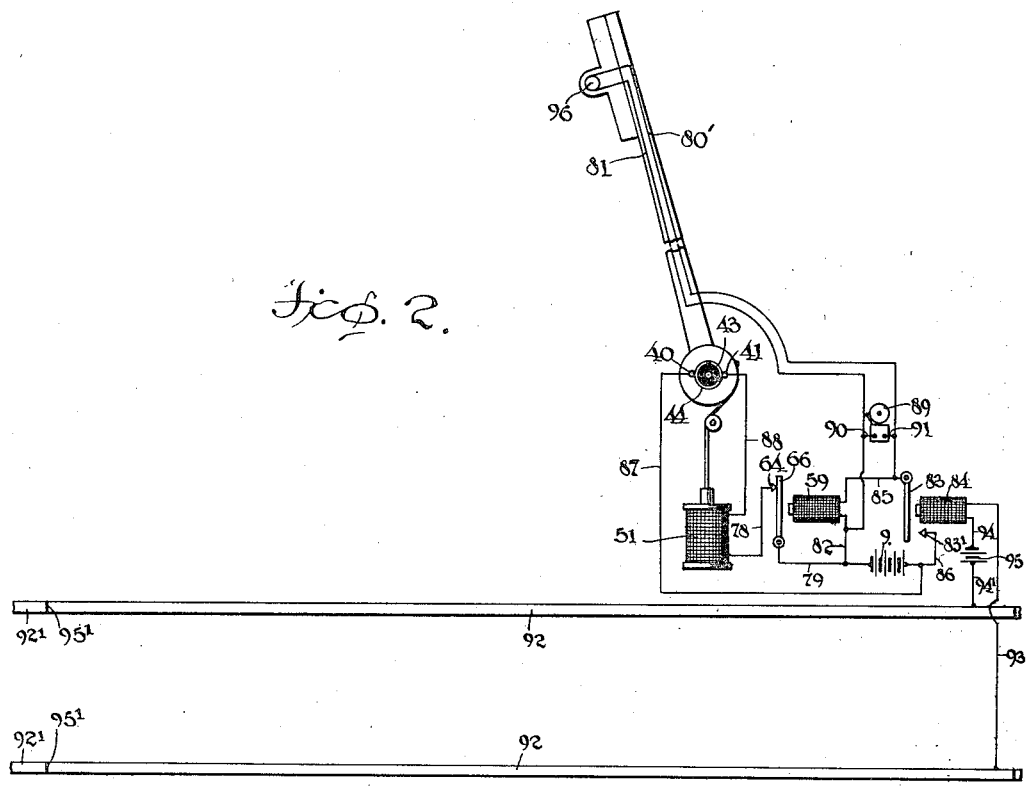
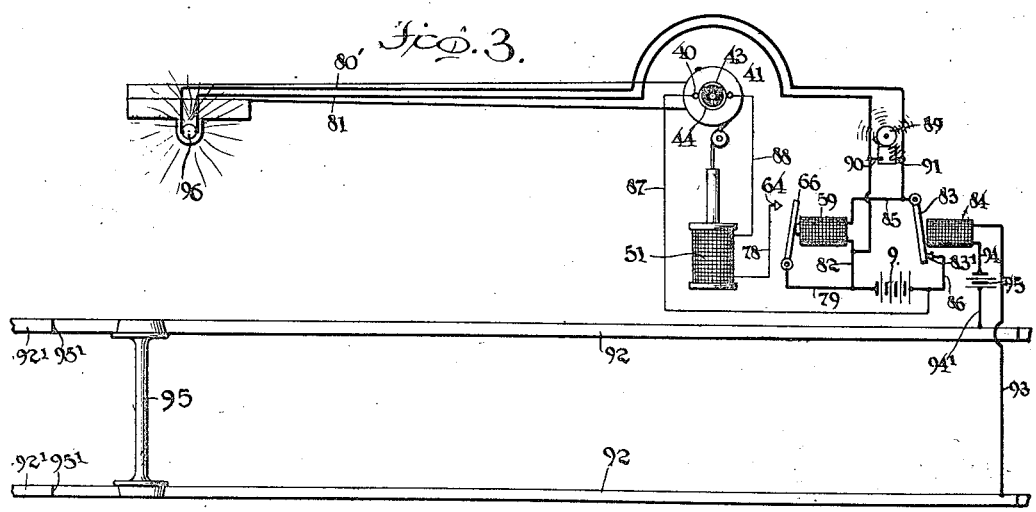

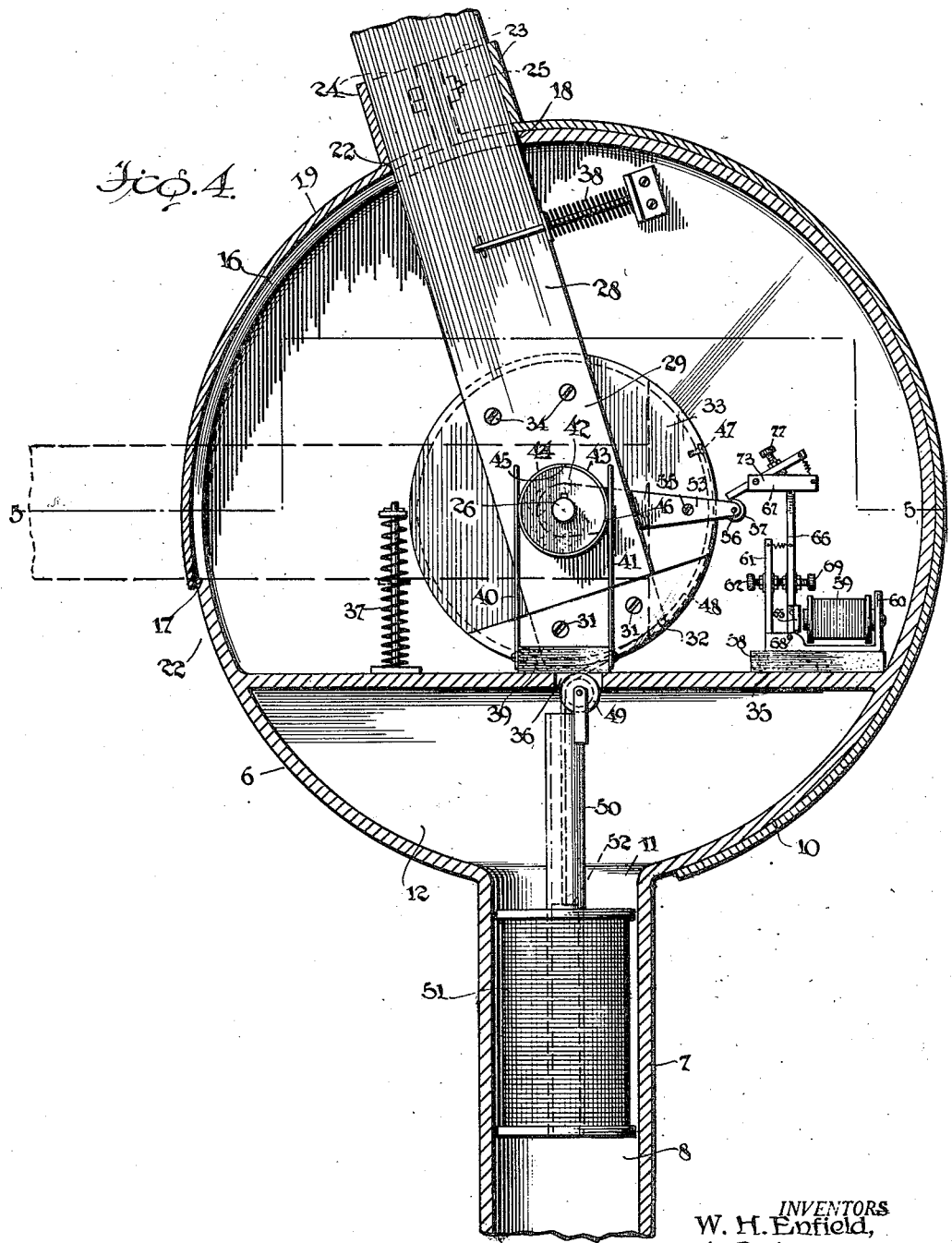

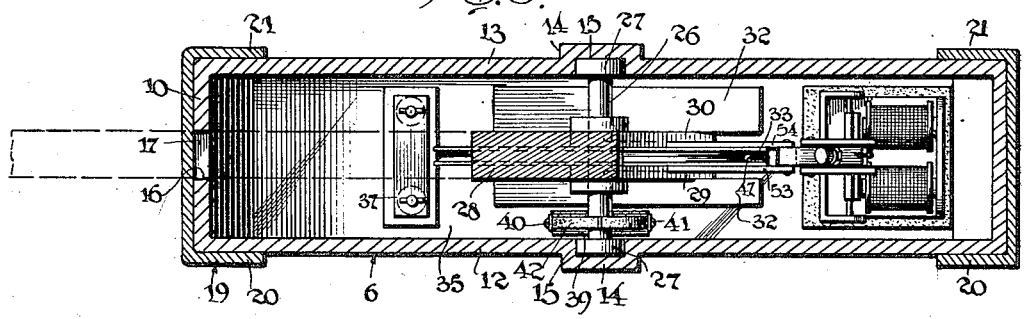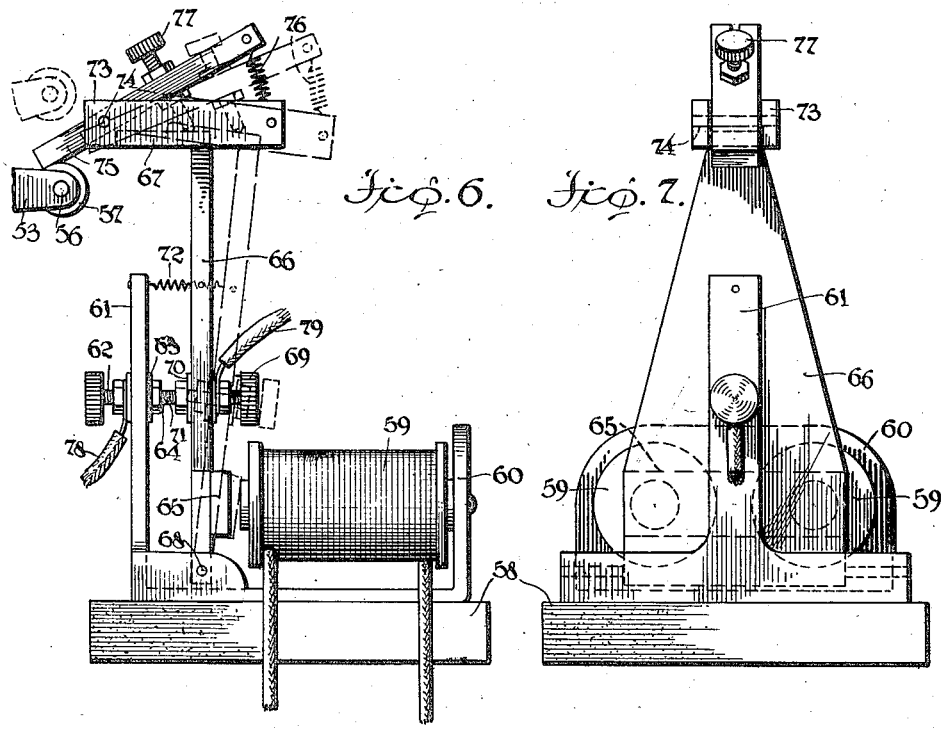

Nov. 11, 1924. 1,515,017
W. H. ENFIELD ET AL
WARNING SIGNAL
Filed Feb. 28, 1924 5 Sheets-Sheet 5
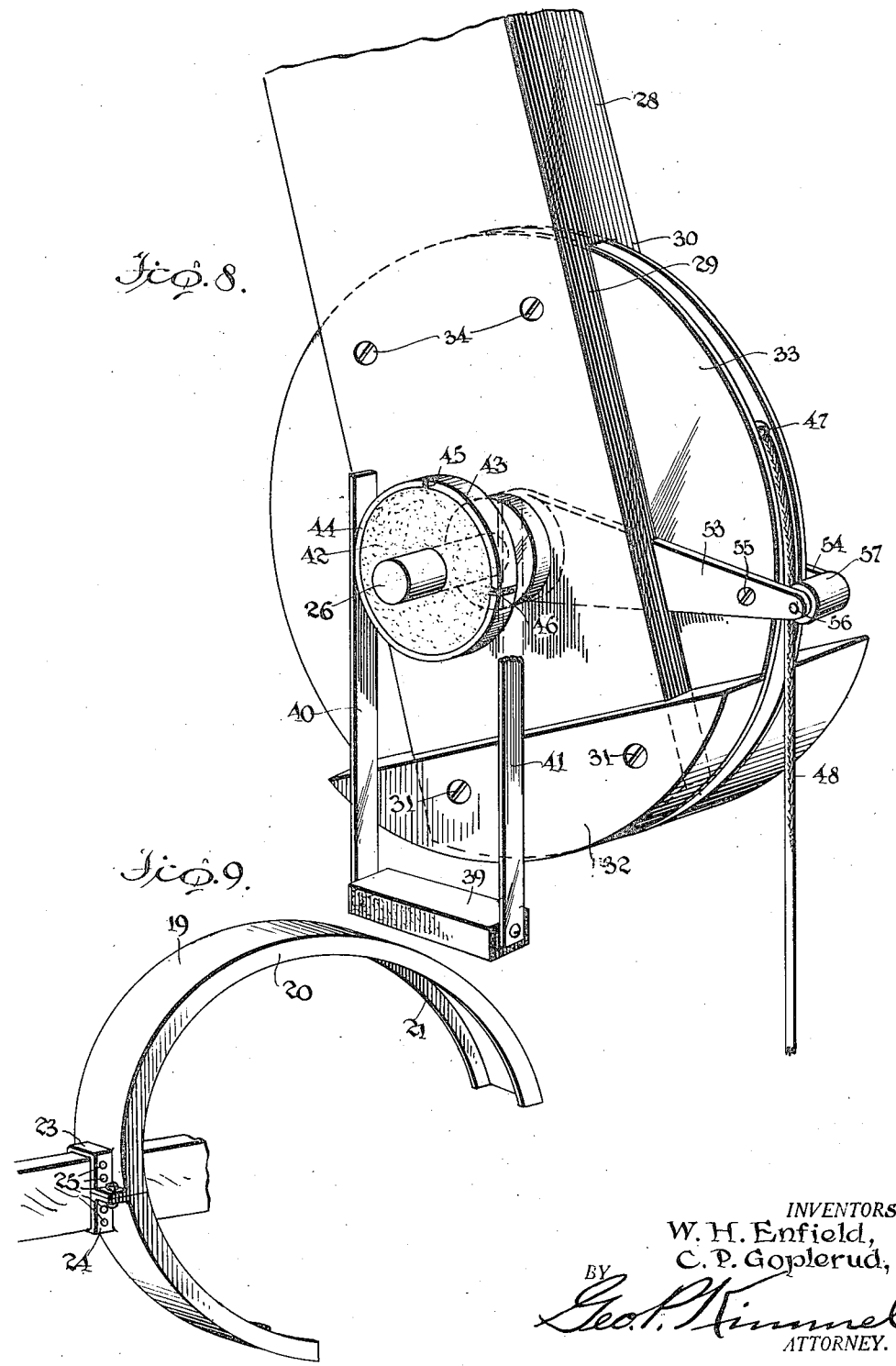
INVENTORS
W. H. Enfield,
C. P. Goplerud,
BY Geo. P. Kimmel
ATTORNEY.

Patented Nov. 11, 1924.

1,515,017

UNITED STATES PATENT OFFICE.

WILLIAM H. ENFIELD AND CLIFFORD P. GOPLERUD, OF OSAGE, IOWA.

WARNING SIGNAL.

Application filed February 28, 1924. Serial No. 695,746.

*To all whom it may concern:*

Be it known that we, WILLIAM H. ENFIELD and CLIFFORD P. GOPLERUD, citizens of the United States, residing at Osage, in the county of Mitchell and State of Iowa, have invented certain new and useful Improvements in Warning Signals, of which the following is a specification.

This invention relates to a warning signal, designed primarily for use at railway crossings, but it is to be understood that a warning signal in accordance with this invention can be used for any purposes for which it is found applicable, and the invention has for its primary object to provide, in a manner as hereinafter set forth, a signal for warning pedestrains, as well as drivers of vehicles, of a train approaching a railway crossing at country highways or city streets for reducing crossing accidents to a minimum.

Briefly described, the signal is of that type operating electrically and by gravity, and includes a support carrying a movable signalling arm which when in non-warning position approaches the vertical and when in warning position is disposed transversely with respect to a highway or street. The arm may be set at any height which will be most effective as a warning, and of a height in order that rapidly moving vehicles may pass under the arm when it is moving downward to its warning position. The elements of the signals are so constructed and arranged so that they will operate to dispose the arm at warning position as soon as a train reaches a predetermined point, variable to suit local conditions, at some distance from the crossing, whereby the arm will be shifted to warning position before the train reaches the crossing. The outer end of the arm will be provided with a suitable warning indication of a type illuminated when the arm starts downward to warning position and remains illuminated as the train passes the crossing, and said warning indication can be of a type whereby light rays will be projected in either direction towards vehicles or pedestrains approaching the crossing. The signal may furthermore be provided with an alarm which will be thrown into operation as the arm starts to move downward to warning position and continues to operate after the arm has reached its warning position. The warning signal may be positioned at any place with respect to a crossing or track, on either side of a highway or street close to the railway crossing, or set some distance back therefrom. It may also be positioned in the center or approximately centrally of the highway or street where traffic is of such density that there is one traffic lane in each direction and in which case the signal shall have two warning or signalling arms extending in opposite directions with respect to each other as a warning for each traffic lane.

Further objects of the invention are to provide, in a manner as hereinafter set forth, a warning signal for the purpose referred to, which is simple in its construction and arrangement, strong, durable compact, thoroughly efficient in its use, automatic in its operation, readily installed, and comparatively inexpensive to set up.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a perspective view of a signal in accordance with this invention and set to warning position and further showing the adaptation thereof in connection with a railway crossing at a highway.

Figure 2 is a diagrammatic view illustrating the signal in non-warning position.

Figure 3 is a diagrammatic view illustrating the signal in warning position.

Figure 4 is a fragmentary view, in section, of the signal and further illustrating in full lines the position of the signal arm in non-warning position, and in dotted lines the position of the signal arm in warning position.

Figure 5 is a section on line 5—5, Figure 4.

Figure 6 is a side elevation, upon an enlarged scale, of the trip mechanism and further illustrating two positions thereof in full and dotted lines.

Figure 7 is a front elevation of the trip mechanism.

Figure 8 is a fragmentary view, in perspective, upon an enlarged scale, of the signal.

Figure 9 is a perspective view in detail of the cover for the slot of the casing or housing.

Referring to the drawings in detail, 1 denotes a railway track, 2 a highway, and the reference character 3 generally indicates a warning signal in accordance with this invention and which is positioned at one side of the track 1 a substantial distance therefrom.

A warning signal in accordance with this invention comprises a base 4, a standard 5, an annular housing 6, which is provided with a depending sleeve 7 secured in any suitable manner to the upper end of the standard 5. The base 4 and standard 5 are hollow for the passage of circuit wires, to be hereinafter referred to. The standard 5 extends into the sleeve 7 for a portion of its length so that that part of the sleeve 7 above the upper end of the standard 5 provides a chamber 8 for a purpose to be presently referred to. Within the base 4 is housed a battery 9.

The housing, which is referred to generally by the reference character 6, consists of an annular body portion 10, provided with an opening 11. Depending and communicating with the latter is the sleeve 7 which is integral with and depends from the body portion 10. The housing 6 further includes a pair of side walls 12, 13 and each of said walls is offset centrally thereof, as at 14, providing a socket 15, and with said sockets oppositely disposed with respect to each other. The body portion 10 is provided with a slot 16, which as of a length approximately ninety degrees, and the lower end wall of the slot 16 is indicated at 17 and is flat. The upper end wall of the slot is indicated at 18 and is bevelled. The slot 16 extends from a point in proximity to and below the center of the front of the body portion and terminates at a point to one side of the center of the top of the body portion. The position of the bottom wall 17 of the slot 16, is such as to support the indicator arm, to be presently referred to, in a position at right angles to the axis of the housing 6 when said arm is in its lowered or indicating position, and the arrangement of the top wall 18 of the slot 16 is such as to arrest the upward movement of the indicator arm, whereby the latter will extend in the position shown in Figure 4.

Slidably mounted upon the body portion 10, is a semi-circular flanged cover 19 for the slot 16. The flanges of the cover 19 are indicated at 20, 21 and oppose the side walls 12 and 13. The cover 19 is provided with an opening 22, through which extends the indicator arm, to be hereinafter referred to, and the outer face of the cover 19 has projecting therefrom flanges 23 and 24 which surround the opening 22 and are adapted to be secured by hold-fast devices 25 to the indicator arm, as illustrated in Figure 9. The length of the cover 19 is such that when the indicator arm is shifted to indicating position the lower end of the cover will abut against the sleeve 7, whereby movement of the cover member is arrested and when the indicator arm is shifted to non-warning position as shown in Figure 4, the movement of the cover 19 will be arrested by the sleeve 7. The cover 19 is formed with a plurality of sections suitably connected together in a manner as indicated in Figure 9.

Arranged within the housing 6 is a shaft 26 having a bearing element 27 at each end, and the bearing elements are journalled in the sockets 15. Connected with the shaft 26 so as to move therewith, is an indicator arm 28, of a length to extend through the slot 16 and opening 22, and further of a length to project a substantial distance from the housing 6. The arm 28 can be constructed of wood or metal and of a contour to have as little resistance to wind and other outside forces as possible. The inner end terminal portion of the arm 28 is bifurcated and the furcations are indicated at 29, 30. Fixedly secured to the inner terminal portion of the furcation 29, by the hold-fast devices 31, as well as to the inner terminal portion of the furcation 30, is a segment-shaped counterweight 32.

Keyed to the shaft 26 and arranged between the furcations 29 and 30, as well as being connected to said furcations, is a grooved pulley 33. The means for connecting the furcations 29 and 30 to the pulley 33 are indicated at 34. Secured within the body portion 10, below the center thereof, is a diametrically extending support 35 formed with an opening 36. Secured to the upper face of the support 35 is a resilient buffer device 37 for the arm 28 when it lowers to warning position. Secured to the inner face of the side wall 13 is a resilient buffer device 38 for the arm 28 when it is shifted to non-warning position.

Secured to the upper face of the support 35 is a block 39 of insulation, and secured to each end thereof is a vertically disposed brush or resilient contact arm and the said brushes are indicated at 40, 41 and which normally bear against a circuit opening and closing device consisting of a circular disk 42 of insulation, which is fixed to the shaft 26 and spaced a substantial distance from the furcation 29 of the arm 28. Secured to the disk 42 is a sectional band of conducting material and the sections of said band are indicated at 43, 44. The section 43 is of less length than the length of the section 44, and said section 43 has it ends spaced from the ends of the section 44, as well as insulated therefrom, by projecting portions 45, 46 of the disk 42. The sections 43 and 44 associate with the brushes 40 and 41 for the purpose of opening and closing a circuit, and the length of the section 43 is such that the brushes 40 and 41 will never simultaneously contact with said section. When the brushes 40, 41, are in contact with the section 44, the circuit will be closed, but when one brush is in contact with the section 43 and the other brush in contact with the section 44, the circuit will be open. The circuit with which the brushes 40 and 41 associate will be hereinafter referred to.

Connected to the pulley 33, as at 47, is the upper end of a shifting cable 48, which is arranged within the groove of the pulley 33 and further depends from said pulley and through the slot 36 and over an idler pulley 49, and extends into a metallic tube 50, which is secured within and projects upwardly from a solenoid 51, arranged in the chamber 8. The core of the solenoid is indicated at 52 and which operates within the tube 50 and is connected to the lower end of the cable 48. When the solenoid 51 is energized, the core 52 thereof is shifted downward carrying the cable 48 therewith, which revolves the pulley 33 and shaft 26 carrying the arm 28 therewith.

The arm 28 is normally retained in elevated or non-warning position through the medium of a holding element coacting with the trip mechanism, and when the holding element is released the arm 28 moves to warning position by gravity as the weight of the two counterweights is such that it will allow the arm to descend to such position by gravity when the holding element is released by the trip mechanism.

The counterweights 32 assist in the return of the arm 28 to non-warning position when the pulley 33 is shifted by the cable 48, due to the action of the solenoid 51.

The retaining element consists of a pair of arms 53, 54, which are keyed to the shaft 26 and also secured to the pulley 33, as at 55. The arms 53, 54, projecting beyond the pulley 33, carry a shaft 56 provided with a roller 57, which is interposed between the outer ends of the arms 53, 54.

Mounted upon the upper face of the support 35, is a base piece 58 provided with a controlling relay 59, forming an element of the trip mechanism which associates with the holding element. The frame 60 of the controlling relay has one end formed with an upright 61 carrying a binding post 62, which is insulated from the upright 61, by a collar 63 of insulation. The inner end of the binding post 62 provides a contact 64. The armature of the controlling relay is indicated at 65 and which is connected to a vertically disposed support 66, provided at its upper end with an extension 67, disposed at right angles with respect thereto. The lower end of the support 66 is pivotally connected to the frame 60, as at 68.

Carried by the support 66 is a binding screw 69, which is insulated from the support 66, by a collar 70 of insulation. The inner end of the binding post 69 provides a contact 71 which is adapted to engage the contact 64, when the parts are in full line position, as shown in Figure 6. For the purpose of maintaining the contacts 64 and 71 in engagement, a spring 72 is provided and which has one end secured to the upper end of the upright 61 and its other end secured to the support 66. The support 66 is of tapered contour. Fixedly secured to one side of the extension 67 and projecting from each end thereof is a rectangular plate 73, standing on edge, and pivotally connected, as at 74, to the plate 67 is a trip arm 75 arranged in the path of the outer end of the holding element. The rear end of the trip arm 73 is connected to the rear end of the plate 67 by pulling spring 76. The trip arm 75 is pivotally connected to the plate 67, at a point between the transverse center and forward end of said trip arm whereby the trip arm is eccentrically mounted on its pivot.

Carried by the trip arm 73, is an adjustable retaining member 77 and which acts as a means to prevent the shifting upwardly of the forward end of the trip arm 75. The adjustable retaining member 77 is adapted to have its lower end abut against the extension 67, whereby the upward movement of the forward end of the trip arm 75 will be prevented.

Connected to the binding post 62 is a circuit wire 78, and connected to the binding post 69 is a circuit wire 79.

When the arm 28 is in the position as shown in Figure 4, in full lines, that is to say in a non-warning position, the holding element will be extended under the forward end of the trip arm 75, and when said element is in such position the arm 28 will be prevented from shifting downwardly. When the control relay is energized, the armature 65 will be shifted carrying the support 66 therewith, to the position shown in dotted lines in Figure 6, whereby the trip arm 75 will be shifted clear of the path of the roller 57 of the holding element and the arm 28 can move to warning position by gravity. The circuit connection 78 associates with the solenoid 51 so that when the support 66 is shifted to the dotted line position shown in Figure 6, the solenoid circuit will be broken, whereby the core 52 and cable 48 will be moved upwardly, due to the action of the pulley 33, which is carried with the arm 28 when the latter lowers. When the controlling relay circuit has been broken, the spring 72 shifts the support 66 to full line position as shown in Figure 6, whereby the contacts 64 and 71 are brought into engagement and the solenoid circuit closed, under such conditions the core 52 is moved downwardly carrying the cable 48 therewith, rotating the pulley 33, and the action of the latter in connection with the counterweights 33 will elevate the arm 28. As the pulley 33 rotates, the roller 56 will ride against the outer end of the trip arm 75, shifting said arm on its pivot so that the roller 57 will clear the arm and be positioned below the lower face thereof, as shown in Figure 4, so that if the pulley 33 is caused to move in the opposite direction, due to the arm 28, the roller 57 engaging under the trip arm 57 will arrest movement of the pulley 33, due to the fact that the movement of the trip arm 75 on its pivot will be arrested by the retaining member 77 engaging the extension 67.

The arm 28 has its outer end provided with a signal or warning sign 80, illuminated through the medium of an electric lamp 96 and with the lamp including lenses so as to project a colored light in both directions at right angles with respect to the arm. The circuit conductors leading to the lamp are indicated at 80', 81 and with the latter extended to a circuit conductor 82, leading from the battery 9 to the relay 59. Leading from the relay 59 to the armature 83 of a track relay 84, is a circuit conductor 85, which is in circuit with the conductor 80' of the lamp 96. In circuit with the conductor 82 is the circuit wire or conductor 79 attached to the armature of the relay 59. Leading from the local circuit battery 9 to the contact 83' is a circuit conductor 86. Extending from the brush 40 to the conductor 86 is a circuit conductor 87. Leading from the solenoid 51 to the brush 41 is a circuit conductor 88. The conductor 78 leads from the solenoid to the contact 64. Interposed in the lamp circuit is an electrical alarm 89 and with the circuit conductors 90, 91 thereof connected respectively to the conductors 80', 81.

Circuit conductors between the track relay 84 and the track rails 92 are indicated at 93, 94, 94'. The battery for the track circuit is indicated at 95. The track rails 92 are insulated from the track rails 92', as at 95'. The train is indicated at 95. The track rails 92 form what may be termed a block.

By the arrangement of the circuit connections as referred to, there is provided a solenoid or arm shifting circuit, a lamp circuit, an alarm circuit, a controlling relay circuit, and a track relay circuit.

The solenoid or arm shifting circuit is as follows:—

From the battery 9, conductor 87, brush 40, conductor 44, brush 41, conductor 88, solenoid 51, conductor 78, contact 64, armature 66, conductor 79 to battery 9.

The lamp circuit will be as follows:—

From battery 9, conductor 82, conductor 81, lamp 96, conductor 80, conductor 85, armature 83, contact 83', conductor 86 to battery 9.

The controlling relay circuit will be as follows:—

From battery 9, conductor 82, winding of relay 59, conductor 85, armature 83, contact 83', conductor 86 to battery 9.

The track relay circuit will be as follows:—

From battery 95, conductor 94', rail 92, conductor 93, winding of relay 84 and conductor 94 back to battery 95.

The alarm 89 rings simultaneously with the illuminating of the lamp 96 at the warning sign 80.

The block 85 is arranged a sufficient distance from the crossing so that when a circuit is formed by a train entering the block, the signal will be shifted to warning position before the train reaches the crossing. The block is to be arranged at each side of the crossing. The length of a block determines the time when signal goes to warning position, so that an increase in block length gives a corresponding increase in time that signal is in warning position.

When the track is clear, the signal is up at non-warning position, the several circuits are open, roller 57 is held fast by the trip arm 75, contacts 64 and 71 are in engagement with each other, and the circuit breaker formed by the insulated sections 43 and 44 open. When a train enters the block, the track circuit is closed, energizing the relay 84, whereby the armature 83 is shifted to engage contact 83', closing the controlling relay circuit to separate the contacts 64, 71 by the shifting of the armature 66 which provides for the moving of the trip arm 73 to a substantially horizontal position, thereby releasing the roller 57, and when the latter is released the arm 28 moves downwardly carrying the roller therewith. When the armature 83 engages contact 83' the lamp and alarm circuits are closed. Just after the roller 57 has been released and the arm 28 starts to move downwardly, the circuit breaker closes, and as the arm 28 moves downward the lamp will be illuminated and simultaneously therewith the bell will ring. When the train leaves the block, the track relay, controlling relay, lamp and alarm circuits are opened and the relay 59 deenergized, whereby the support or armature 66 will be shifted by the spring 72 so that the contacts 64 and 71 will be in engagement with each other and which closes the solenoid or arm shifting circuit, due to the fact that the circuit breaker is closed and remains closed while the arm is moving upwardly.

While the arm is moving upwardly, the roller 57 is moving downwardly towards the arm 73 and just as the roller abuts the arm 73 the circuit breaker or cut-off opens whereby the solenoid or arm shifting circuit is opened and at this point the trip arm 73 moves downwardly allowing the roller 57 to pass, and after the roller has passed the arm 73 flies back to holding position. The arm 28 at this time has reached non-warning position and all the circuits are open.

Instead of employing a solenoid with a grooved pulley and cable for lifting the arm 28 as referred to, it is obvious that a motor of suitable size may be used and in which case the grooved pulley should be replaced by a large spur gear which shall be driven by a small spur gear on the motor shaft in such a way as to secure suitable reduction of motor speed so that the arm 28 will not move too quickly. The gears shall remain in mesh at all times so that the motor will turn backwards and serve as a brake for the descending arm.

If the warning signal is to be employed in connection with a pair of traffic lanes extending in opposite directions, then the signal should be set up with a pair of indicator arms moving in opposite directions to warning and non-warning position.

From the foregoing description taken in connetcion with the accompanying drawings, it will be seen that the device which forms the subject matter of this invention is entirely automatic in its nature and obviates the necessity of maintaining an attendant at a crossing in order to protect persons who use a highway or street, and although the preferred embodiment of the invention is as shown and described, yet it will be understood that various changes may be made in the structural details which fall within the scope of the invention as claimed.

What we claim is:—

1. A warning signal for railway crossings comprising a releasable indicator arm movable when released to warning position by gravity and provided with an illuminable signal, a releasable element for holding said arm in non-warning position, a normally open signal circuit, electrically operated means for shifting said arm from warning to non-warning position, a normally open shifting circuit for said means, a train controlled electrically operated releasable locking mechanism for said element and including means for closing and opening said signal circuit respectively when said arm moves to and from warning position, and a circuit controller positioned by said arm when it reaches warning position and when so positioned coacting with said mechanism when the latter is passive for closing said shifting circuit to move the arm from warning position to be releasably held by said element, said controller further positioned by said arm to open the shifting circuit when the arm reaches non-warning position.

2. A warning signal for railway crossings comprising a releasable indicator arm movable when released to warning position by gravity, an electrically operated alarm operating when said arm is moving towards warning position and in warning position, a normally open alarm circuit, electrically operated means for shifting said arm from warning to non-warning position, a normally open shifting circuit for said means, a train controlled electrically operated releasable locking mechanism for said element and including means for closing and opening said alarm circuit respectively when said arm moves to and from warning position, and a circuit controller positioned by said arm when it reaches warning position and when so positioned coacting with said mechanism when the latter is passive for closing said shifting circuit to move the arm from warning position to be releasably held by said element, said controller further positioned by said arm to open the shifting circuit when the arm reaches non-warning position.

3. A warning signal for railway crossings comprising a releasable indicator arm movable when released to warning position by gravity and provided with an electric signal illuminated when the arm moves towards and is in warning position, an electrically operated alarm operating when said arm moves towards and is in warning position, a normally open signal circuit, a normally open alarm circuit, a releasable element for holding said arm in non-warning position, a train controlled electrically operated releasable locking mechanism for said element and including means for closing and opening said circuits respectively when said arm moves to and from warning position, electrically operated means for shifting said arm from warning to non-warning position, a normally open shifting circuit for said means, and a circuit controller positioned by said arm when it reaches warning position and when in such position coacting with said mechanism when the latter is passive for closing said shifting circuit to move the arm from warning position to be releasably held by said element, said controller further positioned by said arm to open the shifting circuit when the arm reaches non-warning position.

4. In a warning signal for railway crossings the combination with a releasable indicator arm movable when released to warning position by gravity, and a releasable locking element for holding said arm in non-warning position, of a spring controlled pivoted trip arm arranged in the path of said element for releasably locking it and provided with a stop to arrest the shifting of the trip arm by said element from the action of the indicator arm, a shiftable support having said trip arm pivoted thereto, and an electrically operated means for shifting said support to bodily move said trip arm to clear said element to release the indicator arm.

5. In a warning signal for railway crossings the combination with a releasable indicator arm movable when released to warning position by gravity, and a releasable locking element for holding said arm in non-warning position, of a spring controlled pivoted trip arm arranged in the path of said element for releasably locking it and provided with a stop to arrest the shifting of the trip arm by said element from the action of the indicator arm, a shiftable support having said trip arm pivoted thereto, and an electrically operated means for shifting said support to bodily move said trip arm to clear said element to release the indicator arm, said stop carried by said trip arm being adjustable.

6. In a warning signal for railway crossings the combination with a releasable indicator arm movable when released to warning position by graivty, and a releasable locking element for holding said arm in non-warning position, of a spring controlled pivoted trip arm arranged in the path of said element for releasably locking it and provided with a stop to arrest the shifting of the trip arm by said element from the action of the indicator arm, a shiftable support having said trip arm pivoted thereto, an electrically operated means for shifting said support to bodily move said trip arm to clear said element to release the indicator arm, and a controlling spring for said support.

7. In a warning signal for railway crossings the combination with a releasable indicator arm movable when released to warning position by gravity, and a releasable locking element for holding said arm in non-warning position, of a spring controlled pivot trip arm arranged in the path of said element for releasably locking it and provided with a stop to arrest the shifting of said trip arm by said element from the action of the indicator arm, a shiftable support having said trip arm pivoted thereto, an electrically operated means for shifting said support to bodily move said trip arm to clear said element to release the indicator arm, said stop carried by said trip arm being adjustable, and a controlling spring for said support.

8. In a warning signal for railway crossings the combination with a releasable indicator arm movable when released to warning position by gravity, and a releasable locking element for holding said arm in non-warning position, of a spring controlled pivoted trip arm arranged in the path of said element for releasably locking it and provided with a stop to arrest the shifting of the trip arm by said element from the action of the indicator arm, a shiftable support having said trip arm pivoted thereto, an electrically operated means for shifting said support to bodily move said trip arm to clear said element to release the indicator arm, electrically operated means for shifting said arm from warning position to be releasably held by said element, and means positioned by said indicator arm for controlling the operation of said electrically operated shifting means for the indicator arm.

9. In a warning signal for railway crossings the combination with a releasable indicator arm movable when released to warning position by gravity, and a releasable locking element for holding said arm in non-warning position, of a spring controlled pivoted trip arm arranged in the path of said element for releasably locking it and provided with a stop to arrest the shifting of the trip arm by said element from the action of the indicator arm, a shiftable support having said trip arm pivoted thereto, electrically operated means for shifting said support to bodily move said trip arm to clear said element to release the indicator arm, a controlling spring for said support, electrically operated means for shifting said arm from warning position to be releasably held by said element, and means positioned by said indicator arm for controlling the operation of said electrically operated shifting means for the indicator arm.

10. A warning signal for railway crossings comprising a releasable indicator arm movable when released to warning position by gravity and provided with an illuminable signal, a releasable element for holding said arm in non-warning position, a normally open circuit for the signal provided on said arm, electrically operated means for shifting said arm from warning to non-warning position, a normally open shifting circuit for said means, a train controlled electrically operated releasable locking mechanism for said element and including means for closing and opening said signal circuit respectively when said arm moves to and from warning position, a circuit controller positioned by said arm when it reaches warning position and when so positioned coacting with said mechanism when the latter is passive for closing said shifting circuit to move the arm from warning position to be releasably held by said element, said controller further positioned by said arm to open the shifting circuit when the arm reaches non-warning position, a buffer element for said arm when shifted to warning position, and a buffer element for said arm when shifted to non-warning position.

11. A warning signal for railway crossings comprising a releasable indicator arm movable when released to warning position by gravity, an electrically operated alarm operating when said arm is moving towards warning position and in warning position, a normally open alarm circuit, electrically operated means for shifting said arm from warning to non-warning position, a normally open shifting circuit for said means, a train controlled electrically operated releasable locking mechanism for said element and including means for closing and opening said alarm circuit respectively when said arm moves to and from warning position, a circuit controller positioned by said arm when it reaches warning position and when so positioned coacting with said mechanism when the latter is passive for closing said shifting circuit to move the arm from warning position to be releasably held by said element, said controller further positioned by said arm to open the shifting circuit when the arm reaches non-warning position, a buffer element for said arm when shifted to warning position, and a buffer element for said arm when shifted to non-warning position.

12. A warning signal for railway crossings comprising a releasable indicator arm movable when released to warning position by gravity and provided with an electric signal illuminated when the arm moves towards and is in warning position, an electrically operated alarm operating when said arm moves towards and is in warning position, a normally open signal circuit, a normally open alarm circuit, a releasable element for holding said arm in non-warning position, a train controlled electrically operated releasable locking mechanism for said element and including means for closing and opening said circuits respectively when said arm moves to and from warning position, electrically operated means for shifting said arm from warning to non-warning position, a normally open shifting circuit for said means, a circuit controller positioned by said arm when it reaches warning position and when in such position coacting with said mechanism when the latter is passive for closing said shifting circuit to move the arm from warning position to be releasably held by said element, said controller further positioned by said arm to open the shifting circuit when the arm reaches non-warning position, a buffer element for said arm when shifted to warning position, and a buffer element for said arm when shifted to non-warning position.

13. A warning signal for railway crossings comprising a housing provided with a slot, a shiftable cover for the slot mounted on the housing, a rotatable shaft supported within the housing, a normally locked indicator arm having its inner end fixed to the shaft and movable when released by gravity to operative position, said arm extending through said slot and cover, means for securing the cover to the arm, a releasable holding element within the housing for locking the arm in inoperative position, operating means within the housing for releasing said element, an electrically operated means connected with said shaft for returning the indicator arm to inoperative position, and means carried by the shaft for controlling the operation of said electrically operated means.

14. A warning signal for railway crossings comprising a housing provided with a slot, a shiftable cover for the slot mounted on the housing, a rotatable shaft supported within the housing, a normally locked indicator arm having its inner end fixed to the shaft and movable when released by gravity to operative position, said arm extending through said slot and cover, means for securing the cover to the arm, a releasable holding element within the housing for locking the arm in inoperative position, operating means within the housing for releasing said element, an electrically operated means connected with said shaft for returning the indicator arm to inoperative position, means carried by the shaft for controlling the operation of said electrically operated means, and a pair of buffer elements within the housing, one of said elements engageable with said arm when moved to inoperative position and the other engageable with said arm when moved to operative position.

In testimony whereof, we affix our signatures hereto.

WILLIAM H. ENFIELD.
CLIFFORD P. GOPLERUD.